No. 656,756. Patented Aug. 28, 1900.
J. S. STOCKTON.
REIN HOLDER FOR CULTIVATORS.
(Application filed June 1, 1900.)
(No Model.)
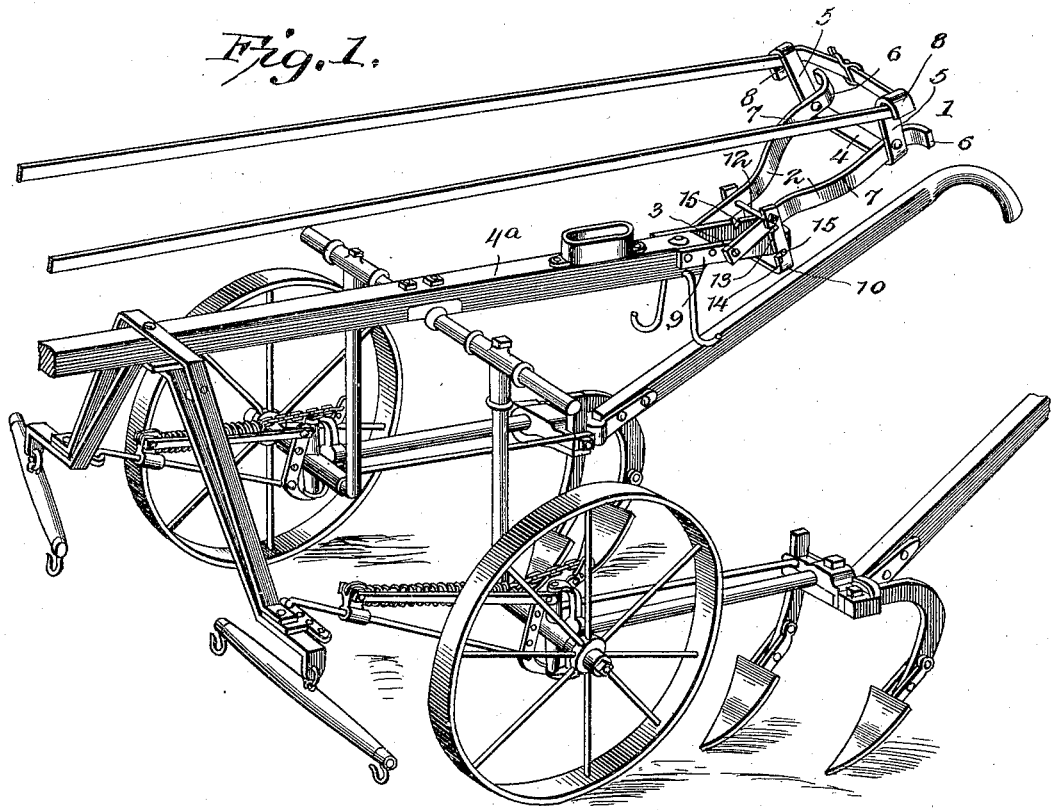
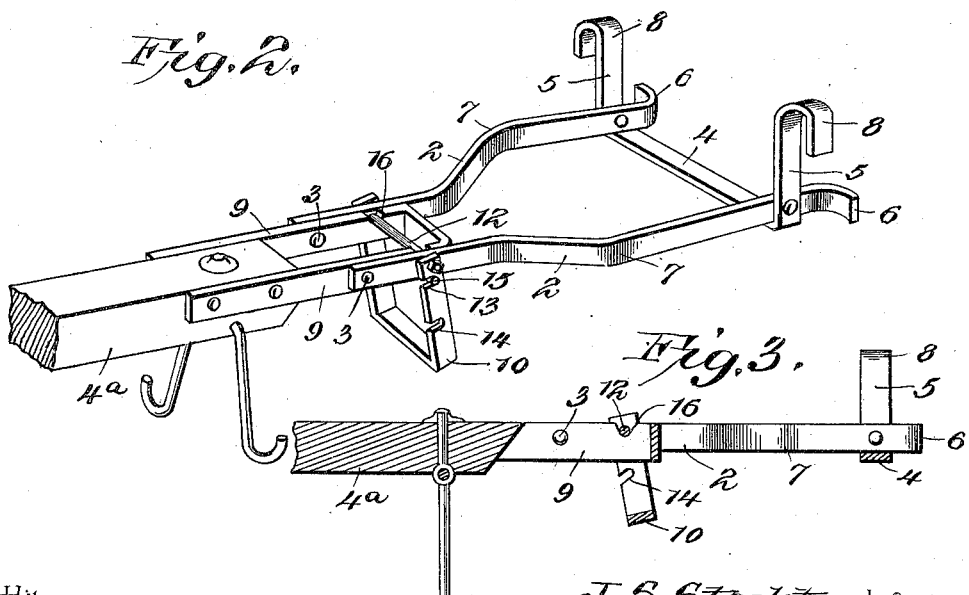
Witnesses
Howard D. Orr.
J. H. Riley
J. S. Stockton, Inventor,
by C. A. Snow & Co.
Attorneys

UNITED STATES PATENT OFFICE.

JAMES SILAS STOCKTON, OF HONEY GROVE, TEXAS.

REIN-HOLDER FOR CULTIVATORS.

SPECIFICATION forming part of Letters Patent No. 656,756, dated August 28, 1900.

Application filed June 1, 1900. Serial No. 18,776. (No model.)

*To all whom it may concern:*

Be it known that I, JAMES SILAS STOCKTON, a citizen of the United States, residing at Honey Grove, in the county of Fannin and State of Texas, have invented a new and useful Rein-Holder for Cultivators, of which the following is a specification.

The invention relates to improvements in rein-holders for cultivators.

The object of the present invention is to improve the construction of rein-holders for cultivators and the like and to provide a simple, inexpensive, and efficient device adapted to be mounted on the rear end of a draft-bar, beam, or analogous member of a cultivator and capable of supporting the reins in an elevated position within convenient reach of the driver to obviate the necessity of his placing the reins around a portion of his body and to permit the free use of his arms in operating the cultivator.

The invention consists in the construction and novel combination and arrangement of parts hereinafter fully described, illustrated in the accompanying drawings, and pointed out in the claims hereto appended.

In the drawings, Figure 1 is a perspective view of a cultivator provided with a rein-holder constructed in accordance with this invention, the rein-supporting frame being in an inclined position. Fig. 2 is an enlarged detail perspective view of the rein-holder, the rein-supporting frame being in a horizontal position. Fig. 3 is a longitudinal sectional view of the same.

Like numerals of reference designate corresponding parts in all the figures of the drawings.

1 designates a rein-supporting frame composed of two sides 2, designed to be pivoted at their lower or front ends by a transverse rod 3 at the rear end of the draft-beam 4ª of a cultivator and adapted to be raised and lowered to support the reins at different elevations. The sides 2 are connected near their rear ends by a transverse bar or piece 4, which has its terminals extended upward to form arms 5, and the rear ends of the sides 2 are curved outward to form supporting-arms 6. The arms 5 of the transverse connecting-piece 4 are riveted or otherwise secured to the sides 2, which are inwardly bent in advance of the transverse connecting-piece 4 at 7, but which may have their front portions otherwise shaped to adapt them to the part to which they are to be pivoted. The terminals of the arms 5 are curved downward and outward to form hooks 8 for engaging over the upper edges of the reins, which are supported upon the upper edges of the outwardly-bent arms 6, and when the reins are supported by the arms 6 and engaged under the hooks 8 they cannot become accidentally disengaged from the supporting-frame by the movements of the horse or other draft animal or animals. The reins extend across the rear portion of the pivoted supporting-frame and are held in convenient position to be readily grasped by the driver, and the said rein-supporting frame will permit the reins to be drawn backward freely without disengaging them from the arms 5 and 6; also, the reins are prevented from dragging upon the ground and from becoming caught in the whiffletrees of the cultivator or around the hubs of the wheels.

The transverse rod 3, which forms the pivot of the rein-supporting frame, passes through the opposite sides of a substantially-rectangular frame 9, secured to the opposite faces of the rear end of the plow-beam 4ª and extending rearward therefrom. The sides 2 of the rein-supporting frame are located at the outer faces of the sides of the rectangular frame and are supported in an inclined position by a brace 10, consisting of a substantially U-shaped stirrup or piece having the terminals of its sides 11 pivoted to the sides of the rein-supporting frame at points between the ends thereof by a transverse rod 12. The brace 10 is arranged outside of the horizontal supporting-frame 9 and extends rearward therefrom, and it is provided at its lower longitudinal edges with notches 13 and 14, which are adapted to receive projections 15, extending laterally from opposite sides of the supporting-frame 9 and preferably formed by a transverse rod which extends entirely across and through the sides of the supporting-frame. When the projections are engaged with the lower notches 14 of the brace, the rein-supporting frame is held in an inclined position, and when the upper recesses 13 are engaged with the projections the rein-supporting frame is locked in a horizontal position, as illustrated in Fig. 2 of the accompanying drawings. The horizontal supporting-frame is provided at the upper edges of its sides with recesses 16, which receive the transverse pivot-rod 12 when the rein-supporting frame is arranged in a horizontal position. The brace which supports and locks the pivoted frame 1 extends rearward from the supporting-frame and is adapted to be readily lifted by the operator to disengage it from the supporting-frame, with which it is interlocked by means of the said projections and recesses.

It will be seen that the rein-holder is exceedingly simple and inexpensive in construction, that it is adapted to be readily applied to the rear end of the draft-beam of a cultivator, and that it is capable of holding the reins in an elevated position to prevent them from dragging upon the ground or becoming caught in any part of the implement or the harness. It will also be apparent that when the reins are interlocked with the upwardly and laterally extending arms 5 and 6 they cannot become accidentally disengaged therefrom by horse motion and that they are stretched across the rein-supporting frame in convenient position to be grasped by the operator and that they may be drawn backward without disengaging them from the pivoted rein-supporting frame.

What is claimed is—

1. A rein-holder for plows, cultivators and the like, comprising a pivoted frame arranged to swing longitudinally of a cultivator or plow and provided at opposite sides with outwardly and upwardly extending arms adapted to receive the reins, and means for holding the pivoted frame in its adjusted position, substantially as described.

2. A rein-holder for plows, cultivators and the like provided with laterally-extending arms for supporting the reins and having upwardly-extending arms terminating in hooks arranged to engage the upper edges of the reins to retain the latter on the supporting-arms, substantially as described.

3. A rein-holder for plows, cultivators and the like provided with a rein-supporting frame composed of sides having outwardly-extended terminals forming rein-supporting arms, means for connecting the sides of the frame, and the upwardly-extending arms located in advance of the rein-supporting arms and terminating in outwardly-extending hooks for engaging the upper edges of the reins, substantially as described.

4. A rein-holder for plows, cultivators and the like, comprising a support, a pivoted rein-supporting frame mounted on the said support and provided with rein-receiving arms, and a brace connecting the supporting-frame with the support, and pivoted to one of the parts and detachably interlocked with the other, substantially as described.

5. A rein-holder for plows, cultivators and the like comprising a supporting-frame adapted to receive the reins and capable of being raised and lowered, a support having the supporting-frame pivotally mounted on it, projections extending from opposite sides of the support, and the substantially-rectangular brace or stirrup pivoted to the supporting-frame and extending rearward from the support, and provided with recesses to receive the said projections, substantially as described.

6. A rein-holder for plows, cultivators and the like comprising a substantially-rectangular frame provided at the upper edges of its sides with recesses, a rein-supporting frame pivotally mounted on the said frame and provided with rein-supporting arms, a transverse rod extending across and projecting from the rectangular frame, and a brace pivoted to the rein-supporting frame and arranged on the exterior of the rectangular frame and engaging the said rod, substantially as described.

7. A rein-holder for plows, cultivators and the like, comprising a pivoted frame arranged to swing upward and downward longitudinally of a plow or cultivator, said pivoted frame being provided with means for supporting the reins, and a pivoted brace arranged to support the frame in its several positions and adapted to permit the same to be readily raised and lowered, substantially as described.

In testimony that I claim the foregoing as my own I have hereto affixed my signature in the presence of two witnesses.

JAMES SILAS STOCKTON.

Witnesses:
J. H. SCOTT,
W. E. STOCKTON.